(12) United States Patent
Ruan

(10) Patent No.: US 12,640,442 B2
(45) Date of Patent: May 26, 2026

(54) FIXING MEMBER, BATTERY, ELECTRIC DEVICE, AND METHOD AND SYSTEM FOR MANUFACTURING BATTERY

(71) Applicant: CONTEMPORARY AMPEREX TECHNOLOGY (HONG KONG) LIMITED, Hong Kong (CN)

(72) Inventor: Shengshen Ruan, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 948 days.

(21) Appl. No.: 17/847,182

(22) Filed: Jun. 23, 2022

(65) Prior Publication Data

US 2022/0384913 A1     Dec. 1, 2022

Related U.S. Application Data

(63) Continuation of application No. PCT/CN2021/096020, filed on May 26, 2021.

(51) Int. Cl.
*H01M 50/517*     (2021.01)
*H01M 10/0525*     (2010.01)
*H01M 50/505*     (2021.01)

(52) U.S. Cl.
CPC ..... *H01M 50/517* (2021.01); *H01M 10/0525* (2013.01); *H01M 50/505* (2021.01); *H01M 2220/20* (2013.01)

(58) Field of Classification Search
None
See application file for complete search history.

(56) References Cited

FOREIGN PATENT DOCUMENTS

| | | |
|---|---|---|
| CN | 103636028 A | 3/2014 |
| CN | 103636028 B | 3/2014 |
| CN | 108376756 A | 3/2014 |
| CN | 210866313 U | 6/2020 |
| CN | 112768845 A | 5/2021 |
| CN | 112820987 A | 5/2021 |
| DE | 102013017249 A1 | 4/2015 |
| FR | 3062956 A1 | 8/2018 |

(Continued)

OTHER PUBLICATIONS

Machine translation of JP 2012138333 (Year: 2012).*

(Continued)

*Primary Examiner* — Wyatt P McConnell
(74) *Attorney, Agent, or Firm* — XSENSUS LLP

(57) ABSTRACT

Embodiments of the application provide a fixing member, a battery, an electric device, a battery, and a method and system for manufacturing the battery. The fixing member according to an embodiment of the application is used for fixing a workpiece, and comprises a base for connecting an external pedestal; a top cover connected to the base, an accommodating groove for accommodating the workpiece being formed between the base and the top cover; a first elastic member arranged between the top wall and the bottom wall of the accommodating groove; and a second elastic member arranged between two inner side walls of the accommodating groove. The fixing member according to an embodiment of the application can reduce the shaking of the workpiece and improve the stability of the battery.

21 Claims, 8 Drawing Sheets

(56)          References Cited

FOREIGN PATENT DOCUMENTS

| JP | 2004-140921 | A | 5/2004 |
| JP | 2004-293786 | A | 10/2004 |
| JP | 2005-160273 | A | 6/2005 |
| JP | 2012-138333 | A | 7/2012 |
| JP | 2012138333 | * | 7/2012 |
| JP | 2012-164477 | A | 8/2012 |
| JP | 5103525 | B2 | 12/2012 |
| JP | 2013-004186 | A | 1/2013 |
| JP | 2017-204330 | A | 11/2017 |
| JP | 2018-032489 | A | 3/2018 |
| JP | 3226491 | U | 7/2020 |
| JP | 2021-013230 | A | 2/2021 |
| WO | 03/048424 | A1 | 6/2003 |
| WO | 2006/041034 | A1 | 4/2006 |
| WO | 2010/001477 | A1 | 1/2010 |
| WO | 2011/142201 | A1 | 11/2011 |
| WO | 2014/192720 | A1 | 12/2014 |
| WO | 2015/101268 | A1 | 7/2015 |
| WO | 2019/148662 | A1 | 8/2019 |

OTHER PUBLICATIONS

Office Action issued Apr. 16, 2024 in Chinese Patent Application No. 202180007080.1 with English translation thereof.

Extended European search report issued on Jun. 19, 2023, in corresponding European patent Application No. 21908115.5, 6 pages.

Office Action issued on Dec. 12, 2023, in corresponding Japanese patent Application No. 2022-565932, 10 pages.

Office Action issued Sep. 30, 2024 in Korean Patent Application No. 10-2022-7038691 with English Translation thereof.

International Search Report issued May 26, 2021, issued in International Application PCT/CN2021/096020.

* cited by examiner

1

2

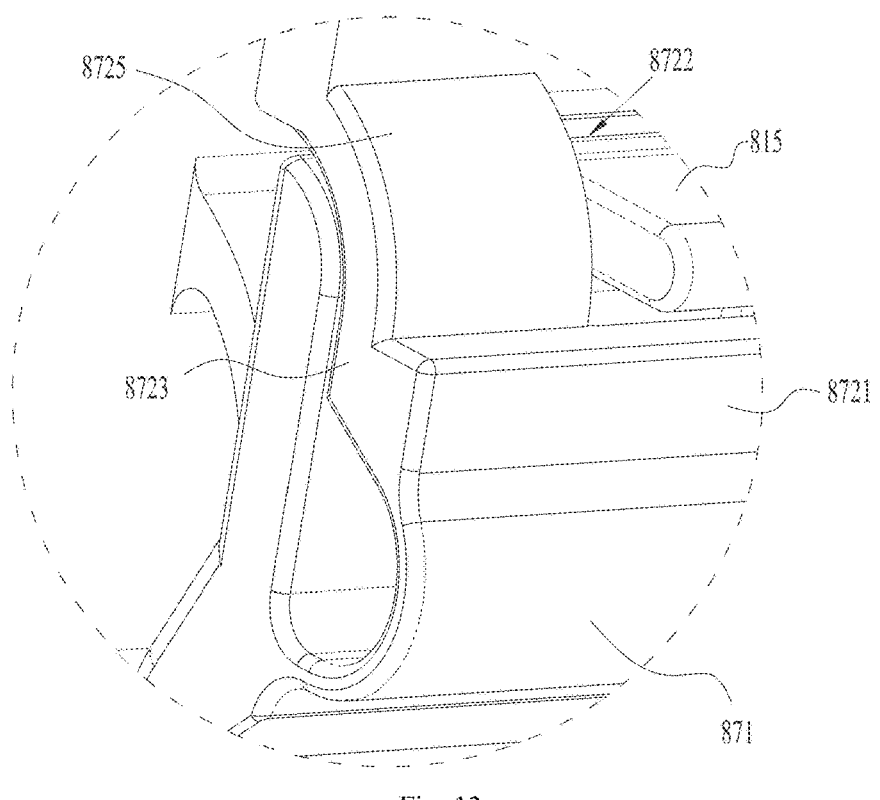

Fig. 13

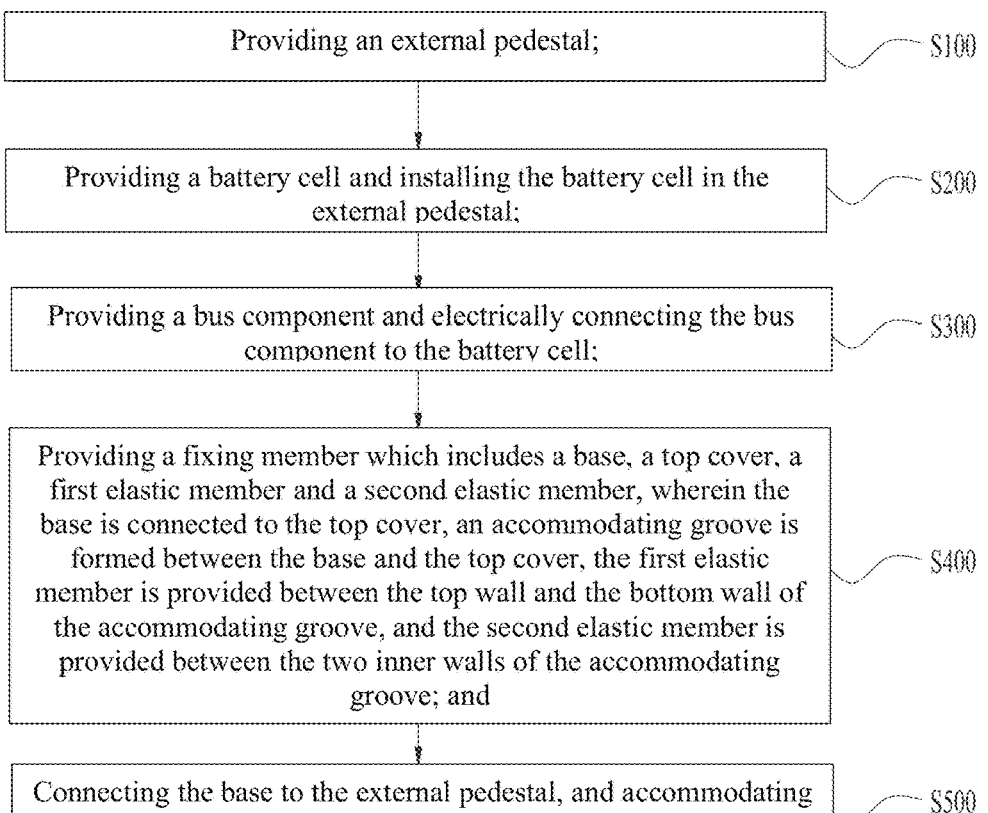

| | |
|---|---|
| Providing an external pedestal; | S100 |
| Providing a battery cell and installing the battery cell in the external pedestal; | S200 |
| Providing a bus component and electrically connecting the bus component to the battery cell; | S300 |
| Providing a fixing member which includes a base, a top cover, a first elastic member and a second elastic member, wherein the base is connected to the top cover, an accommodating groove is formed between the base and the top cover, the first elastic member is provided between the top wall and the bottom wall of the accommodating groove, and the second elastic member is provided between the two inner walls of the accommodating groove; and | S400 |
| Connecting the base to the external pedestal, and accommodating part of the bus component in the accommodating groove. | S500 |

Fig. 14

FIXING MEMBER, BATTERY, ELECTRIC DEVICE, AND METHOD AND SYSTEM FOR MANUFACTURING BATTERY

CROSS-REFERENCE TO RELATED APPLICATION

This application claims priority to and the benefit of PCT/CN2021/096020, filed May 26, 2021, the entire content of which is incorporated herein by reference.

TECHNICAL FIELD

The application relates to the technical field of batteries, and more particularly relates to a fixing member, a battery, an electric device, and a method and system for manufacturing the battery.

BACKGROUND ART

Battery cells are widely used in electronic devices such as mobile phones, laptops, battery cars, electric vehicles, electric aircrafts, electric boats, electric toy cars, electric toy boats, electric toy planes, electric tools, etc. Battery cells can include nickel-cadmium battery cells, nickel-hydrogen battery cells, lithium ion battery cells and secondary alkaline zinc-manganese battery cells.

A plurality of battery cells are assembled together to form a battery, when used in groups. In related art, as the battery vibrates, some workpieces contained therein may be easily driven to vibrate, which affects the stability of the battery.

SUMMARY OF THE INVENTION

The application provides a fixing member, a battery, an electric device and a method and system for manufacturing the battery, which can reduce the shaking of a workpiece and improve the stability of the battery.

In a first aspect, an embodiment of the application provides a fixing member for fixing a workpiece, which includes:

a base for connecting an external pedestal;

a top cover connected to the base, an accommodating groove for accommodating the workpiece being formed between the base and the top cover;

a first elastic member arranged between the top wall and the bottom wall of the accommodating groove, and configured to abut against the workpiece in a first direction to fix the workpiece between the top wall and the bottom wall; and a second elastic member arranged between two inner side walls of the accommodating groove, and configured to abut against the workpiece in a second direction to fix the workpiece between the two inner side walls of the accommodating groove, with the first direction intersecting with the second direction.

In the above solution, the first elastic member can abut against the workpiece in the first direction to fix the workpiece in the first direction, and the second elastic member can abut against the workpiece in the second direction to fix the workpiece in the second direction. The fixing member according to an embodiment of the application may fix the workpiece in the first direction and the second direction, thereby improving the stability of the workpiece, reducing the risk of joint failure of the workpiece and the battery cell and improving the working performance of the battery.

When the position of the workpiece needs to be adjusted, the workpiece is forced by an operator or operating equipment to squeeze the first elastic member and the second elastic member, which are deformed due to the elastic deformation ability, so as to realize the movement of the workpiece. Therefore, the fixing member according to an embodiment of the application can realize the movement of the workpiece and reduce the difficulty of adjusting the position of the workpiece.

Based on the elastic deformation ability of the first elastic member, the space occupied by the first elastic member in the first direction can be adjusted by changing the elastic deformation amount of the first elastic member; as a result, the first elastic member may fix workpieces with different sizes in the first direction. Likewise, based on the elastic deformation ability of the second elastic member, the space occupied by the second elastic member in the second direction can be adjusted by changing the elastic deformation amount of the second elastic member; as a result, the second elastic member may fix workpieces with different sizes in the second direction. In a word, the fixing member according to an embodiment of the application can be used for fixing workpieces of various specifications, and has good universality.

In some embodiments, the top cover includes a body portion, an inner wall, facing the base, of the body portion, is configured to constitute at least part of the top wall, and the first elastic member is arranged on the body portion of the top cover.

In some embodiments, the first elastic member includes a first elastic portion connected to the body portion of the top cover, and a first abutting portion connected to one end, facing away from the body portion, of the first elastic portion. In the first direction, the first abutting portion and the bottom wall are arranged at intervals, and the first abutting portion is configured to abut against the workpiece to fix the workpiece between the first abutting portion and the bottom wall.

In some embodiments, at least part of the first elastic portion is arc-shaped. The arc-shaped structure has good elasticity, which is helpful to improving the elastic deformation ability of the first elastic portion.

In some embodiments, the first elastic member includes at least two first elastic portions arranged at intervals in the second direction. In the first direction, the two first elastic portions are located between the first abutting portion and the body portion, and may improve the stress uniformity of the first abutting portion and enhance the stability of the workpiece.

In some embodiments, the first elastic portion includes a first base portion connected to a surface, facing the body portion, of the first abutting portion, and having two first surfaces arranged opposite to each other in the thickness direction thereof; a first supporting portion connecting the body portion and one end, facing away from the first abutting portion of the first base portion; a first protrusion portion protruding from the first surface of the first base portion; and a second supporting portion connecting the first protrusion portion and the body portion, wherein the first supporting portion and the second supporting portion are arranged at intervals in a third direction which intersects with both the first direction and the second direction.

In some embodiments, the two inner side walls of the accommodating groove are a first inner side wall and a second inner side wall respectively which are arranged opposite to each other in the second direction. The second elastic member includes a second elastic portion, one end of which is connected to the first inner side wall; and a second abutting portion connected to the other end, facing away from the first inner side wall, of the second elastic portion. In the second direction, the second abutting portion and the second inner side wall are arranged at intervals, and the second abutting portion is configured to abut against the workpiece to fix the workpiece between the second abutting portion and the second inner side wall.

In some embodiments, a groove is formed on the base and constitutes at least part of the accommodating groove. The groove is formed on the base to increase the space between the base and the top cover.

In some embodiments, the base includes a bottom plate, and a first limiting part and a second limiting part connected thereto, the first limiting part and the second limiting part are arranged at intervals in the second direction, the bottom plate, the first limiting part and the second limiting part form the groove. One end of the top cover is clamped to the first limiting part, and/or the other end thereof is clamped to the second limiting part. The clamping mode of connection is convenient to disassemble and assemble, and is helpful to simplify the assembly process of the workpiece and the fixing member. In replacing the workpiece, the fixing member, which may be reused, may not be structurally damaged.

In some embodiments, one end of the top cover is clamped to the first limiting part, and the other end thereof is rotatably connected to the second limiting part through a connecting member. The top cover may be rotated to detach from the first limiting part, which is convenient for the assembly of the fixing member and the workpiece; at the same time, the connecting member can maintain the connection between the top cover and the base when the top cover is detached from the first limiting part, thus preventing the top cover from falling.

In some embodiments, the connecting member includes a deformation portion rotatably connected to the second limiting part, and a connecting portion connected to the deformation portion and the top cover and provided with a backstop portion. The base is provided with a first convex rib protruding from the second limiting part; when the top cover is clamped to the first limiting part, the first convex rib fits with the backstop portion to limit the movement of the connecting portion in the first direction away from the base. The first convex rib can strengthen the local strength of the second limiting part. In the closing process, the top cover pulls the deformation portion and the connecting portion; and the first convex rib may fit with the backstop portion to limit the movement of the connecting portion in the first direction away from the base, avoiding excessive deformation of the deformation portion.

In some embodiments, the base is further provided with a second convex rib protruding from the second limiting part, and the second convex rib fits with the connecting portion to limit the movement of the connecting portion in a direction towards the second limiting part. The second convex rib can strengthen the local strength of the second limiting part. In the closing process, the top cover pulls the deformation portion and the connection part; and the second convex rib may abut against the connecting portion to limit the movement of the connecting portion in a direction towards the second limiting part, avoiding excessive deformation of the deformation portion under the action of the connecting portion.

In some embodiments, the first convex rib and the second convex rib are integrally formed.

In some embodiments, the connecting portion is provided with a first through hole, the backstop portion is formed on one side, close to the deformation portion, of the first through hole, and the first convex rib is inserted into the first through hole to fit with the backstop portion when the top cover is clamped to the first limiting part.

In some embodiments, the backstop portion is connected to an end, facing away from the second limiting part, of the deformation portion. The connecting portion further includes a second protrusion portion protruding from a surface, facing the second limiting part, of the backstop portion; a first extension portion connecting the top cover and one end, facing away from the deformation portion, of the backstop portion; and a second extension portion connected to the second protrusion portion and the top cover; the first extension portion and the second extension portion are arranged at intervals in a third direction which intersects with both the first direction and the second direction; and the first through hole is formed between the first extension portion and the second extension portion.

In some embodiments, the first limiting part includes a limiting plate, and a clamping seat connected to the limiting plate and located at one side, away from the second limiting part, of the limiting plate, and a clamping slot is formed between the limiting plate and the clamping seat. The top cover includes a buckling portion used for being inserted into the clamping slot and clamped on the clamping seat.

In some embodiments, the buckling portion includes a first clamping portion and a second clamping portion, both arranged in a third direction which intersects with both the first direction and the second direction. The clamping seat includes a third clamping portion and a fourth clamping portion which are arranged in the third direction. When the buckle is clamped on the clamping seat, the first clamping portion is located at one side, facing the bottom wall, of the third clamping portion, and the second clamping portion is located at one side, facing the bottom wall, of the fourth clamping portion. A clamping surface between the first clamping portion and the third clamping portion and a clamping surface between the second clamping portion and the fourth clamping portion are arranged in a staggered way in the first direction and/or the second direction. According to an embodiment of the application, a two-stage buckle structure may be formed to improve the structural stability and reduce the risk that the buckling portion comes off the clamping slot.

In some embodiments, the top cover includes a body portion, and at least two bent portions connected to both ends of the body portion respectively in the second direction, and each of the bent portions is bent towards one side close to the base with respect to the body portion. The two bent portions are provided with second through holes aligned in the second direction, through which an external strap may pass.

In some embodiments, the first elastic member is provided with a third through hole, and the projection of the second through hole in the second direction at least partially overlaps with the projection of the third through hole in the second direction. When an external strap passes through the fixing member through the second through hole, the third through hole may provide an avoidance space for the external strap to avoid the first elastic member interfering with the external strap.

In some embodiments, the fixing member further includes a mounting part arranged on one side, facing away from the top cover, of the base, and connected to the base. The mounting part is installed in the external pedestal and includes a clamping shaft and a plurality of elastic cards protruding from an outer peripheral surface thereof. The elastic card can be clamped to the external pedestal to install the fixing member on the external pedestal.

In some embodiments, the workpiece includes a bus component of a battery.

In a second aspect, an embodiment of the application provides a battery, which includes a battery cell, a bus component electrically connected to the battery cell and configured to pass through an accommodating groove, and the fixing member according to any one of the embodiments of the first aspect.

In a third aspect, an embodiment of the application provides an electric device, including the battery of the second aspect, the battery is configured to provide electrical energy.

In a fourth aspect, an embodiment of the application provides a method for manufacturing a battery, which includes:

providing an external pedestal;

providing a battery cell and installing the battery cell in the external pedestal;

providing a bus component and electrically connecting the bus component to the battery cell;

providing a fixing member which includes a base, a top cover, a first elastic member and a second elastic member, wherein the base is connected to the top cover, an accommodating groove is formed between the base and the top cover, the first elastic member is provided between the top wall and the bottom wall of the accommodating groove, and the second elastic member is provided between the two inner walls of the accommodating groove; and connecting the base to the external pedestal, and accommodating part of the bus component in the accommodating groove, wherein the first elastic member is configured to abut against the bus component in a first direction to fix the bus component between the top wall and the bottom wall, and the second elastic member is configured to abut against the bus component in a second direction to fix the bus component between two inner side walls of the accommodating groove, the first direction intersects with the second direction.

In a fourth aspect, an embodiment of the application provides a system for manufacturing a battery, comprising:

a first supply device, configured to provide an external pedestal;

a second supply device, configured to provide a battery cell and install the battery cell in the external pedestal;

a third supply device, configured to provide a bus component and electrically connecting the bus component to the battery cell;

a fourth supply device, configured to provide a fixing member which includes a base, a top cover, a first elastic member and a second elastic member, wherein the base is connected to the top cover, an accommodating groove is formed between the base and the top cover, the first elastic member is provided between the top wall and the bottom wall of the accommodating groove, and the second elastic member is provided between the two inner walls of the accommodating groove; and an assembly device, connecting the base to the external pedestal, and accommodating part of the bus component in the accommodating groove, wherein the first elastic member is configured to abut against the bus component in a first direction to fix the bus component between the top wall and the bottom wall, and the second elastic member is configured to abut against the bus component in a second direction to fix the bus component between two inner side walls of the accommodating groove, the first direction intersects with the second direction.

BRIEF DESCRIPTION OF THE DRAWINGS

In order to describe the technical solutions in the embodiments of the application more clearly, the accompanying drawings required for describing the embodiments are briefly described below. Obviously, the accompanying drawings in the following description show merely some embodiments of the present disclosure, and a person of ordinary skill in the art would also be able to derive other accompanying drawings from these accompanying drawings without creative efforts.

FIG. 13 is an enlarged view of the fixing member at the round frame C in FIG. 12.

FIG. 14 is a schematic flow chart of a method for manufacturing a battery provided in some embodiments of the application.

Figure 1:
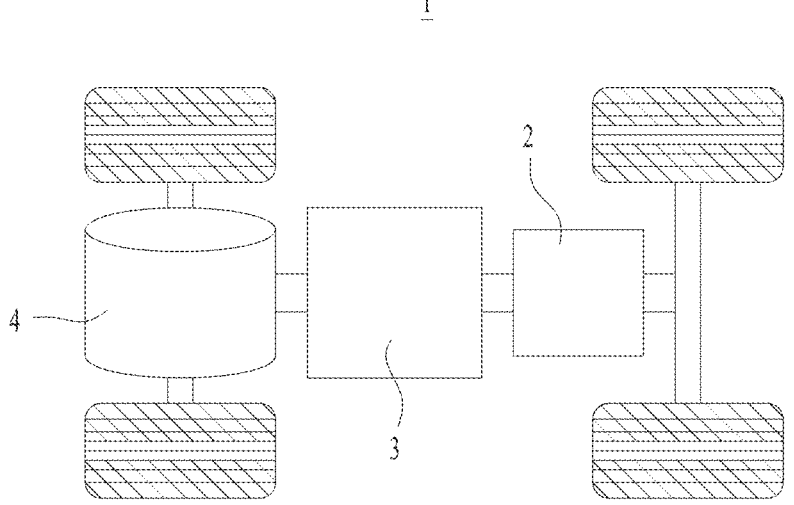
FIG. 1 is a structural schematic diagram of a vehicle provided in some embodiments of the application.

In the drawings, the components are not drawn to actual scale.

SPECIFIC EMBODIMENTS

To make the objectives, technical solutions, and advantages of the embodiments of the application clearer, the following will clearly describes the technical solutions in the embodiments of the application with reference to the accompanying drawings in the embodiments of the application. Apparently, the described embodiments are some rather than all of the embodiments of the application. Based on the embodiments of the application, all other embodiments obtained by those of ordinary skill in the art without making creative efforts fall within the scope of protection of the application.

Unless otherwise defined, all technical and scientific terms used in the application have the same meanings as those commonly understood by those who belong to the technical field of the present application. In the application, the terms used in the specification of the application are merely for the purpose of describing specific embodiments, and are not intended to limit the application. The terms "including" and "having" and any variations thereof in the specification and claims of the application and the above accompanying drawings are intended to cover non-exclusive inclusion. The terms "first", "second", etc. in the specification and claims of the application or the above accompanying drawings are used to distinguish different objects, but not to describe a specific order or primary and secondary relationship.

Reference to an "embodiment" in the application means that a specific feature, structure or characteristic described in conjunction with an embodiment may be included in at least one embodiment of the application. The appearance of this phrase in various places in the specification does not necessarily mean the same embodiment, nor is it an independent or alternative embodiment mutually exclusive with other embodiments.

In the description of the application, it should be noted that, unless otherwise explicitly specified and defined, the terms "mounting", "connecting", "connection" and "attachment" should be understood in a broad sense, for example, they may be a fixed connection, a detachable connection, or an integrated connection; and may be a direct connection, or an indirect connection via an intermediate medium, or communication inside two elements. For those of ordinary skill in the art, the specific meanings of the above terms in the application could be understood according to specific circumstances.

As used herein, the term "and/or" is merely used to describe an associated relationship between associated objects and means three relationships, for example, A and/or B may mean A alone, A and B together, and B alone. In addition, the character "/" in the application generally indicates that the associated objects are an "or" relationship.

In the embodiments of the application, the same reference numerals refer to same components, and for the sake of brevity, detailed descriptions of the same components are omitted in different embodiments. It should be understood that a thickness, a length, a width and other dimensions of various components and an overall thickness, length, width and other dimensions of an integrated device shown in the accompanying drawings in the embodiments of the application are merely exemplary, and should not constitute any limitation on the application.

The term "plurality" in the application means two or more.

In the application, battery cells may include a lithium ion secondary battery cell, a lithium ion primary battery cell, a lithium-sulfur battery, a sodium lithium-ion battery cell, a sodium ion battery cell, a magnesium ion battery cell, etc., which are not limited by the embodiments of the application. The battery cell may be in cylindrical, flat, cuboid or other shapes, which is not limited by the embodiments of the application. Generally, the battery cells are divided into three types according to packaging manners: cylindrical battery cells, square battery cells and pouch battery cells, which are not limited by the embodiments of the application.

The battery mentioned in the embodiments of the application refers to a single physical module which includes one or a plurality of battery cells and therefore provides a higher voltage and capacity. Generally, the battery includes a box for packaging one or a plurality of battery cells. The box may prevent liquid or other foreign matter from affecting charging or discharging of the battery cell.

The battery cell includes an electrode assembly and an electrolyte, and the electrode assembly includes a positive pole piece, a negative pole piece and a separator. The battery cell works mainly depending on movement of metal ions between the positive pole piece and the negative pole piece. The positive pole piece includes a positive current collector and a positive active material layer coated on a surface of the positive current collector; the positive current collector includes a positive current collecting portion and a positive protrusion portion protruding from the positive current collecting portion, the positive current collecting portion is coated with the positive active material layer, at least part of the positive protrusion portion is not coated with the positive active material layer, and the positive protrusion portion serves as a positive tab. Taking a lithium ion battery as an example, the positive current collector may be made of aluminum, and the positive active material layer includes a positive active material which may be lithium cobaltate, lithium iron phosphate, ternary lithium or lithium manganate. The negative pole piece includes a negative current collector and a negative active material layer coated on a surface of the negative current collector; the negative current collector includes a negative current collecting portion and a negative protrusion portion protruding from the negative current collecting portion, the negative current collecting portion is coated with the negative active material layer, at least part of the negative protrusion portion is not coated with the negative active material layer, and the negative protrusion portion serves as a negative tab. The negative current collector may be made of copper, and the negative active material layer includes a negative active material which may be carbon or silicon. In order to guarantee fusing does not occur during large current flow, a plurality of positive tabs are stacked together, and a plurality of negative tabs are stacked together. The separator may be made of polypropylene (PP) or polyethylene(PE). In addition, the electrode assembly may be in a wound structure or a laminated structure, which is not limited in the embodiments of the application.

The inventors found that a battery generally includes a workpiece electrically connected to a battery cell, and some workpieces (e.g. bus component, high-voltage connecting member and cable) are relatively long. The workpieces such as bus components and cables are easy to shake as the battery vibrates, which leads to a risk of joint failure of the workpiece and the battery cell, and affects working performance and service life of the battery.

The inventors tried to fix the workpiece with a strap, for example, to bind a bus component or cable to other components of the battery, so as to improve the stability of the workpiece and reduce the shaking of the workpiece when the battery vibrates. However, the inventors found it difficult to displace or adjust the position of the workpiece after fastened with a strap; and the strap must be cut off to remove the workpiece, which operation is complicated.

In view of this, an embodiment of the application provides a fixing member for fixing a workpiece, which includes a base for connecting an external pedestal; a top cover connected to the base, an accommodating groove for accommodating the workpiece being formed between the base and the top cover; a first elastic member arranged between the top wall and the bottom wall of the accommodating groove, and configured to abut against the workpiece in a first direction to fix the workpiece between the top wall and the bottom wall; and a second elastic member arranged between two inner side walls of the accommodating groove, and configured to abut against the workpiece in a second direction to fix the workpiece between the two inner side walls of the accommodating groove, with the first direction intersecting with the second direction. The fixing member according to an embodiment of the application can effectively fix the workpiece, simplify the assembly process of the fixing member and the workpiece, and can be applied to workpieces of various specifications.

The fixing member described in an embodiment of the application is suitable for batteries and electric devices that use batteries.

The electric devices may be vehicles, mobile phones, portable devices, laptops, ships, spacecraft, electric toys and electric tools. The vehicles may be fuel vehicles, gas vehicles or new energy vehicles, and the new energy vehicles may be battery electric vehicles, hybrid electric vehicles, extended-range vehicles, etc. The spacecrafts include airplanes, rockets, space shuttles, spaceships, etc. The electric toys include fixed or mobile electric toys, such as game machines, electric car toys, electric ship toys and electric airplane toys. The electric tools include metal cutting electric tools, electric grinding tools, electric assembling tools and electric tools for railways, such as electric drills, electric grinders, electric wrenches, electric screwdrivers, electric hammers, impact electric drills, concrete vibrators, electric planers, etc. The embodiment of the application does not impose special restrictions on the above-mentioned electric devices.

For the sake of illustration, the following embodiments are illustrated with a vehicle as an electric device.

FIG. 1 is a schematic structural diagram of a vehicle provided in some embodiments of the application. As shown in FIG. 1, a battery 2 is disposed inside a vehicle 1, and the battery 2 may be disposed at the bottom, head or tail of the vehicle 1. The battery 2 may be used for supplying electricity to the vehicle 1, for example, the battery 2 may be used as an operating power source for the vehicle 1.

The vehicle 1 may further include a controller 3 and a motor 4, where the controller 3 is used for controlling the battery 2 to supply electricity to the motor 4 to be used for, for example, operating electricity requirements during start-up, navigation and running of the vehicle 1.

In some embodiments of the application, the battery 2 may not only serve as the operating power source for the vehicle 1, but also serve as a driving power source for the vehicle 1, so as to replace or partially replace fuel or natural gas to provide driving power for the vehicle 1.

Figure 2:
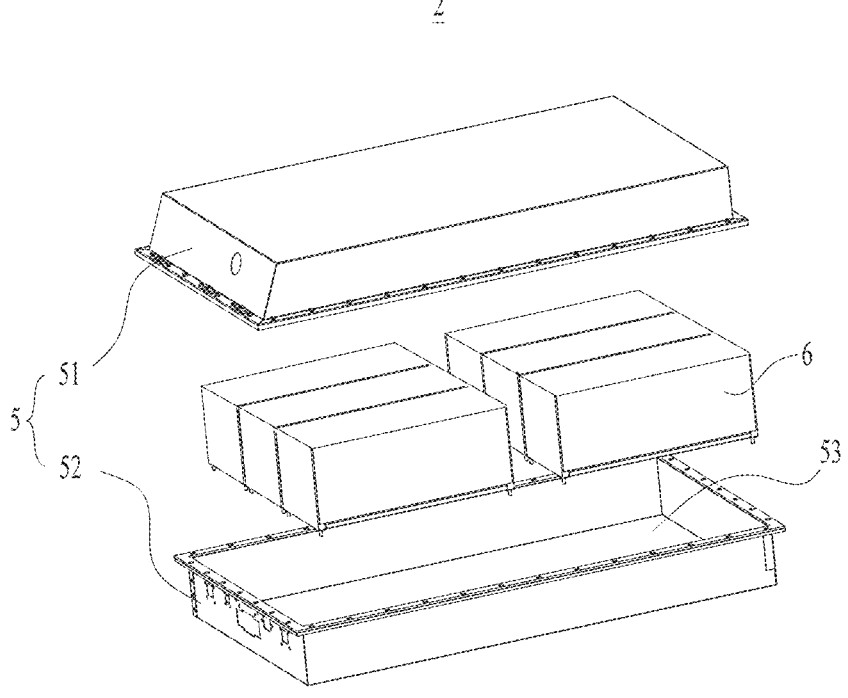
FIG. 2 is an exploded view of a battery provided in some embodiments of the application.

FIG. 2 is an exploded view of a battery provided in some embodiments of the application. As shown in FIG. 2, the battery 2 includes a box 5 and a battery cell (not shown in FIG. 2), and the battery cell is accommodated in the box 5.

The box 5 is used for accommodating the battery cell and may be of various structures. In some embodiments, the box 5 may include a first box portion 51 and a second box portion 52, the first box portion 51 and the second box portion 52 may cover each other, and the first box portion 51 and the second box portion 52 define an accommodation space 53 for accommodating the battery cell together. The second box portion 52 may be of a hollow structure with an opening end, the first box portion 51 is of a plate-like structure, and the first box portion 51 covers an opening side of the second box portion 52 so as to form the box 5 with the accommodation space 53. The first box portion 51 and the second box portion 52 may be both of hollow structures with opening sides, and an opening side of the first box portion 51 covers the opening side of the second box portion 52 so as to form the box 5 with the accommodation space 53. Of course, the first box portion 51 and the second box portion 52 may be in various shapes, such as a cylinder or a cuboid.

In order to improve sealability after the first box portion 51 and the second box portion 52 are connected, a sealing member, such as a sealant or a sealing ring, may be arranged between the first box portion 51 and the second box portion 52.

Assuming that the first box portion 51 covers a top portion of the second box portion 52, the first box portion 51 may also be referred to as an upper box cover, and the second box portion 52 may also be referred to as a lower box.

There may be one or more battery cells in the battery 2. If there are a plurality of battery cells, the plurality of battery cells may be connected in series, in parallel, or in a series-parallel manner. A plurality of battery cells may be directly connected in series, parallel or combination thereof, and then the whole formed by the plurality of battery cells is accommodated in the box 5; certainly, it is also possible that a plurality of battery cells are connected in series, parallel or combination thereof to form a battery module 6, and then a plurality of battery modules 6 are connected in series, parallel or combination thereof to form a whole through a bus component, which is then accommodated in the box 5.

Figure 3:
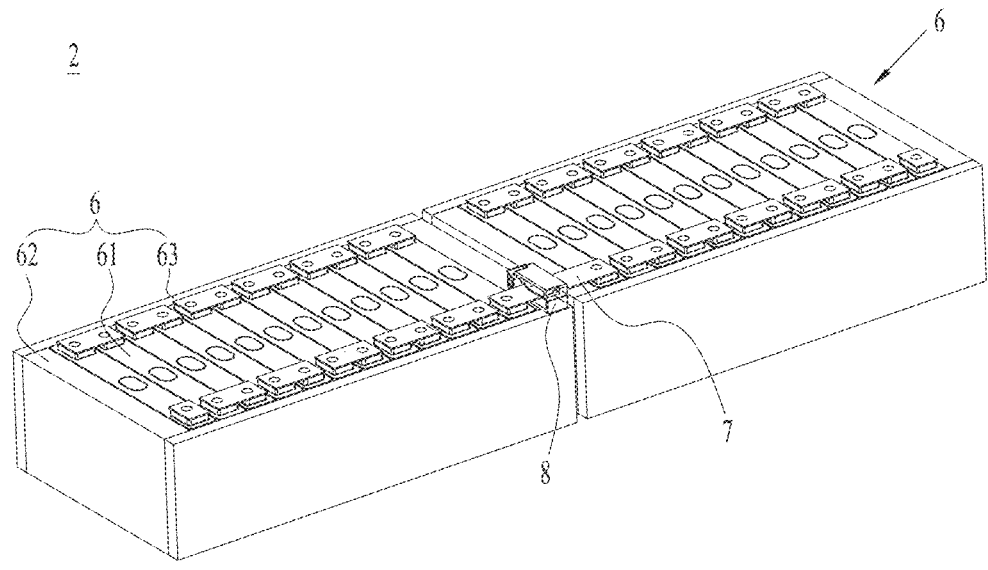
FIG. 3 is a schematic diagram of a partial structure of a battery provided in some embodiments of the application.

FIG. 3 is a schematic diagram of a partial structure of a battery provided in some embodiments of the application.

As shown in FIG. 3, in some embodiments, the battery 2 includes a plurality of battery modules 6, and each of the battery modules 6 includes a plurality of battery cells 61; and the battery 2 further includes a bus component 7, through which the plurality of battery cells 61 in the battery module 6 may be electrically connected, so as to allow the plurality of battery cells 61 in the battery module 6 to be connected in parallel, series or combination thereof. The bus component 7 may further be used to connect the plurality of battery modules 6 in series, parallel or combination thereof to form a whole.

In some embodiments, the battery module 6 further includes two end plates 62 and two side plates 63, wherein the two end plates 62 are arranged on both ends of the plurality of battery cells 61 in the alignment direction, the two side plates 63 are arranged on both sides of the plurality of battery units 61, the two end plates 62 and the two side plates 63 are fixedly connected to form a substantially rectangular frame for holding the plurality of battery units 61.

In some embodiments, the battery 2 further includes a cable (not shown) electrically connected to the battery cell 61.

The fixing member 8 provided in an embodiment of the application can effectively fix the workpiece, simplify the assembly process of the fixing member 8 and the workpiece, and can be applied to workpieces of various specifications. The workpiece fixed by the fixing member 8 according to the application may be a bus component 7, a cable, a high-voltage connecting member or other workpieces applied in the battery 2.

The fixing member 8 according to an embodiment of the application is used to connect the external pedestal of the battery 2. The external pedestal is a component for mounting the fixing member 8, and is determined according to the position of the workpiece fixed by the fixing member 8. For example, the external pedestal may be the box of the battery 2, the end plate 62, the bracket in the box or other fixed structures.

Figure 4:
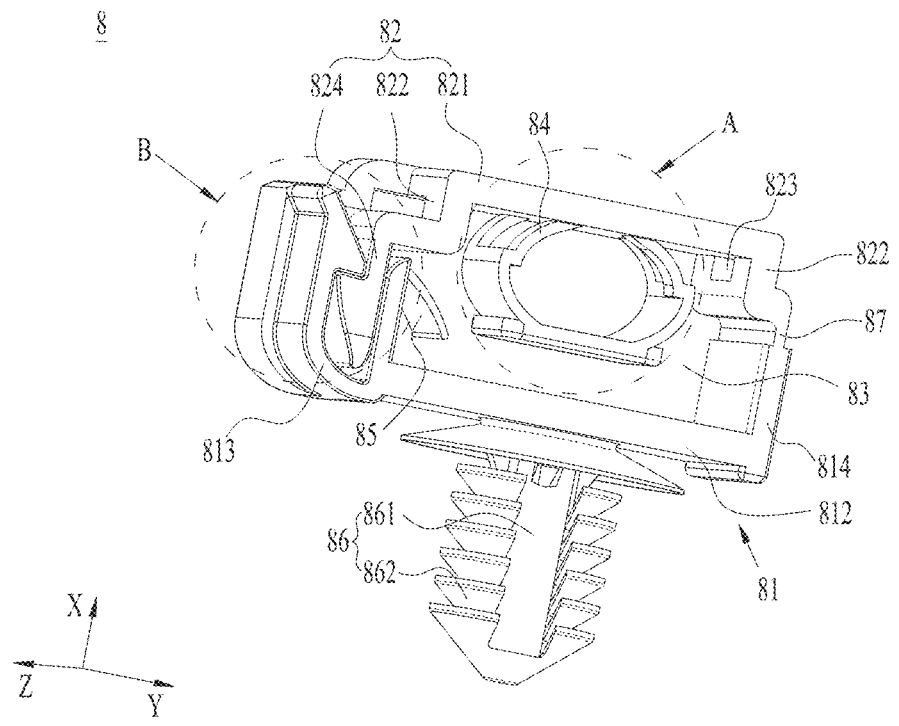
FIG. 4 is a structural schematic diagram of a fixing member provided in some embodiments of the application.
Figure 5:
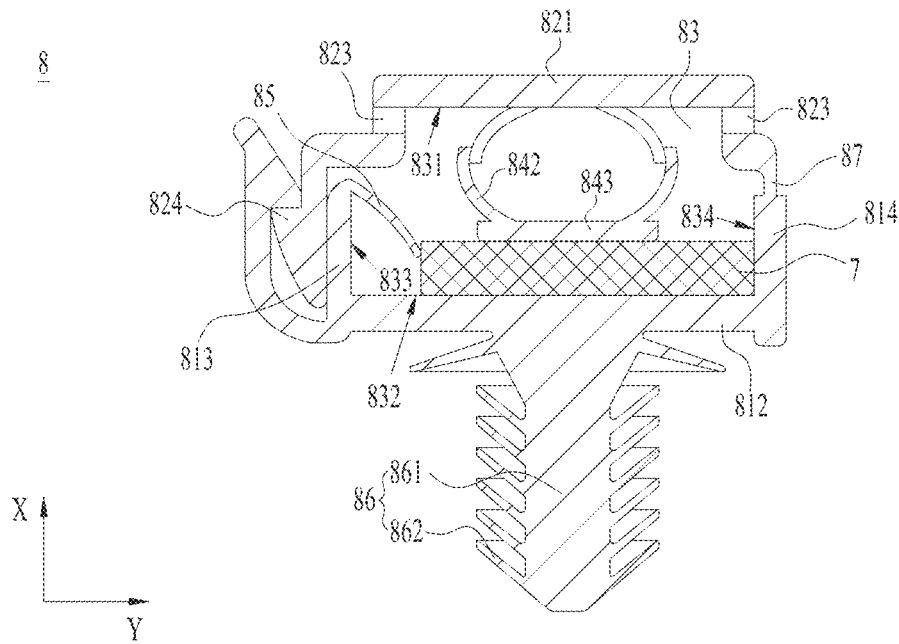
FIG. 5 is a structural schematic diagram of a fixing member provided in some embodiments of the application when fixing a workpiece.
Figure 6:
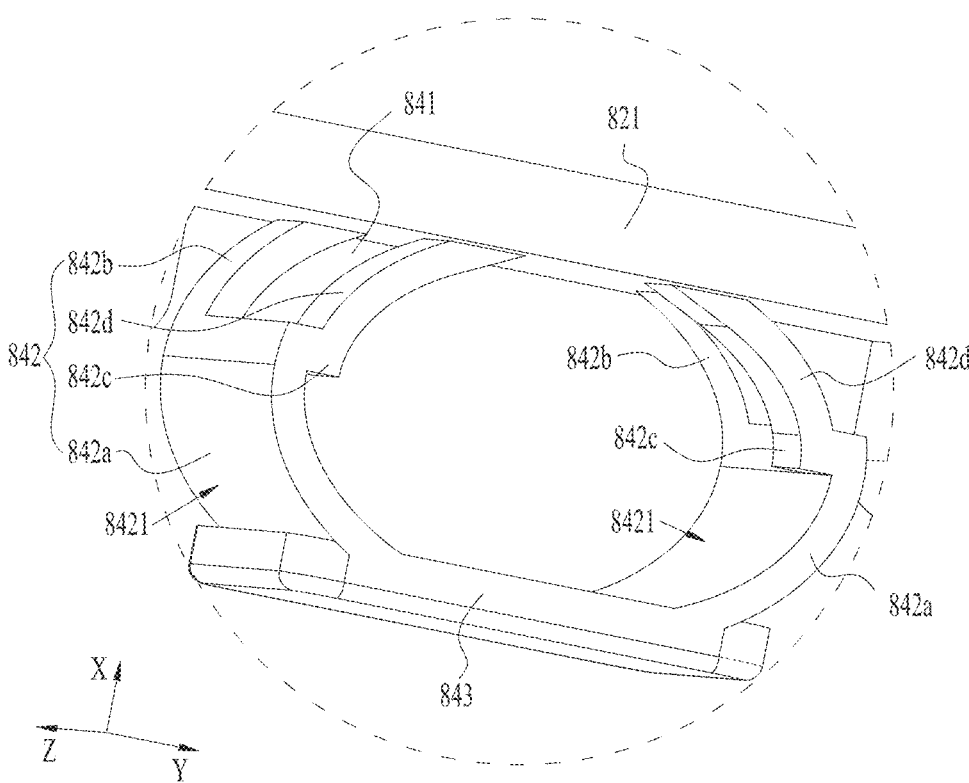
FIG. 6 is an enlarged view of the fixing member at the round frame A in FIG. 4.
Figure 7:
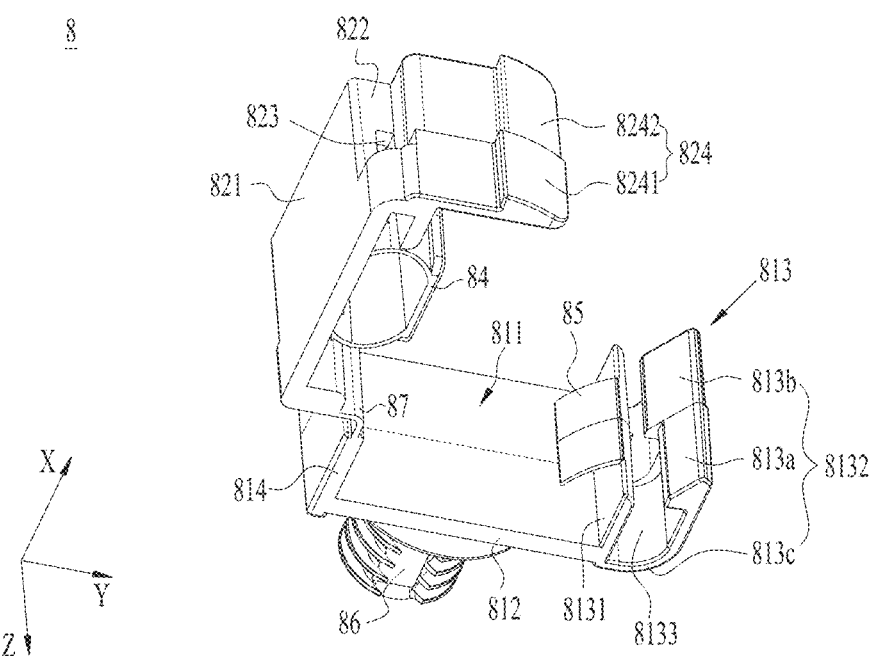
FIG. 7 is a structural schematic diagram of the fixing member in FIG. 4 before clamping.

FIG. 4 is a structural schematic diagram of a fixing member provided in some embodiments of the application; FIG. 5 is a structural schematic diagram of a fixing member provided in some embodiments of the application when fixing a workpiece; FIG. 6 is an enlarged view of the fixing member at the round frame A in FIG. 4; and FIG. 7 is a structural schematic diagram of the fixing member in FIG. 4 before clamping.

As shown in FIGS. 4 to 7, the fixing member 8 according to an embodiment of the application is used for fixing a workpiece. The fixing member 8 includes a base 81 for connecting an external pedestal; a top cover 82 connected to the base 81, an accommodating groove 83 for accommodating the workpiece being formed between the base 81 and the top cover 82; a first elastic member 84 arranged between the top wall 831 and the bottom wall 832 of the accommodating groove 83, and configured to abut against the workpiece in a first direction X to fix the workpiece between the top wall 831 and the bottom wall 832; and a second elastic member 85 arranged between two inner side walls of the accommodating groove 83, and configured to abut against the workpiece in a second direction Y to fix the workpiece between the two inner side walls of the accommodating groove 83, with the first direction X intersecting with the second direction Y.

The base 81 is installed in the external pedestal, and may be installed in, for example, a box of battery, an end plate, a bracket in a box or other fixed structures. In some embodiments, the base 81 is detachably connected to an external pedestal.

The top cover 82 may be detachably connected or undetachably connected (e.g., welded) to the base 81. The top cover 82 and the base 81 may be independent members or two parts of an integrally formed member, and may be connected by their own structures or by other members (e.g. fasteners).

The accommodating groove 83 may also be called an accommodating cavity, and is open at both ends. The workpiece may pass through the accommodating groove 83 via the opening thereof The top wall 831 and the bottom wall 832 of the accommodating groove 83 are arranged opposite to each other in the first direction X, and may be curved walls or flat walls. Exemplarily, the top wall 831 and the bottom wall 832 of the accommodating groove 83 are both flat walls and arranged in parallel. Optionally, the top wall 831 and the bottom wall 832 of the accommodating groove 83 are perpendicular to the first direction X.

The first elastic member 84 is arranged between the top wall 831 and the bottom wall 832 of the accommodating groove 83, and may be connected to either the top wall 831 or the bottom wall 832 of the accommodating groove 83.

The first elastic member 84 has an elastic structure, which may be elastically deformed to a certain extent due to good elasticity.

The number of the first elastic members 84 may be one or more. In some examples, the number of the first elastic member 84 is one, and the first elastic member may be arranged on the top wall 831 or the bottom wall 832 of the accommodating groove 83. In other examples, the number of the first elastic member 84 is two or more, and the two first elastic members 84 are arranged on the top wall 831 and the bottom wall 832 of the accommodating groove 83 respectively. In still other examples, the number of the first elastic member 84 is two or more, and the two first elastic members 84 are arranged on the top wall 831 or the bottom wall 832 of the accommodating groove 83.

When the workpiece passes through the accommodating groove 83, the first elastic member 84 abuts against the workpiece from one side thereof in the first direction X. The first elastic member 84 is elastically deformed under the action of the workpiece; correspondingly, the first elastic member 84 applies an elastic force to the workpiece to abut against the workpiece.

When the workpiece passes through the accommodating groove 83, the first elastic member 84 is arranged on one side, close to the top wall 831, of the workpiece in the first direction X, or on one side, close to the bottom wall 832, of the workepiece in the first direction X, or on both sides of the workpiece in the first direction X. In some examples, the first elastic member 84 is arranged on one side, close to the top wall 831, of the workpiece in the first direction X, and abuts against the workpiece, enabling the workpiece to abut against the bottom wall 832 and to be fixed between the first elastic member 84 and the bottom wall 832. In other examples, the first elastic member 84 is arranged on one side, close to the bottom wall 832, of the workpiece in the first direction X, and abuts against the workpiece so that the workpiece abuts against the top wall 831 and is thus fixed between the first elastic member 84 and the top wall 831. In still other examples, the first elastic members 84 are arranged at both sides of the workpiece in the first direction X to abut against and fix the workpiece from both sides.

The two inner side walls of the accommodating groove 83 are arranged opposite to each other in the second direction Y, and may be curved walls or flat walls. Exemplarily, the two inner side walls of the accommodating groove 83 are flat walls and arranged in parallel, and optionally, the two inner side walls are perpendicular to the second direction Y. The two inner side walls of the accommodating groove 83 may be referred to as a first inner side wall 833 and a second inner side wall 834, respectively.

The peripheral wall surrounding the accommodating groove 83 includes a top wall 831, a bottom wall 832, a first inner side wall 833 and a second inner side wall 834. The peripheral wall may only include a top wall 831, a bottom wall 832, a first inner side wall 833 and a second inner side wall 834, and may also include other connecting walls. For example, the peripheral wall further includes a first connecting wall connecting the top wall 831 and the first inner side wall 833; and the first connecting wall may be a flat wall, a curved wall or a wall of other shapes. Certainly, the peripheral wall may further include a second connecting wall, a third connecting wall, and the like.

The second elastic member 85 is arranged between the two inner side walls of the accommodating groove 83, can be connected to either the first inner side wall 833 or the second inner side wall 834.

The second elastic member 85 has an elastic structure, which may be elastically deformed to a certain extent due to good elasticity.

The number of the second elastic members 85 may be one or more. In some examples, the number of the second elastic member 85, which is arranged on one inner side wall, may be one. In other examples, the number of the two second elastic members 85 may be two or more, and the two second elastic members 85 are arranged on the two inner side walls respectively.

In still other examples, the number of the two second elastic members 85 is two or more, and the two second elastic members 85 are arranged on the same inner side wall.

When the workpiece passes through the accommodating groove 83, the second elastic member 85 abuts against the workpiece from one side thereof in the second direction Y.

The second elastic member 85 is elastically deformed under the action of the workpiece; correspondingly, the second elastic member 85 applies an elastic force to the workpiece to abut against the workpiece.

When the workpiece passes through the accommodating groove 83, the second elastic member 85 is arranged on one side of the workpiece in the second direction Y, or on both sides of the workpiece in the second direction Y. In some examples, the second elastic member 85 is arranged on one side of the workpiece in the second direction Y, and abuts against the workpiece, enabling the workpiece to abut against an inner side wall and to be fixed between the second elastic member 85 and the inner side wall. In other examples, the second elastic members 85, which are arranged on both sides of the workpiece in the second direction Y, abut against and fix the workpiece from both sides.

The first direction X intersects with the second direction Y, and optionally, the first direction X is perpendicular to the second direction Y. The accommodating groove 83 is open at both ends in a third direction Z, which intersects with both the first direction X and the second direction Y; illustratively, the third direction Z is perpendicular to the first direction X and the second direction Y.

In the fixing member 8 according to an embodiment of the application, the first elastic member 84 can abut against and fix the workpiece in the first direction X, and the second elastic member 85 can abut against and fix the workpiece in the second direction Y. The fixing member 8 according to an embodiment of the application may fix the workpiece in the first direction X and the second direction Y, thereby improving the stability of the workpiece, reducing the risk of joint failure of the workpiece and the battery cell and improving the working performance of the battery.

When the position of the workpiece needs to be adjusted, the workpiece is forced by an operator or operating equipment to squeeze the first elastic member 84 and the second elastic member 85, which are deformed due to the elastic deformation ability, so as to realize the movement of the workpiece. Therefore, the fixing member 8 according to an embodiment of the application can realize the movement of the workpiece and reduce the difficulty of adjusting the position of the workpiece.

Based on the elastic deformation ability of the first elastic member 84, the space occupied by the first elastic member 84 in the first direction X can be adjusted by changing the elastic deformation amount of the first elastic member 84; as a result, the first elastic member 84 may fix workpieces with different sizes in the first direction X. Likewise, based on the elastic deformation ability of the second elastic member 85, the space occupied by the second elastic member 85 in the second direction Y can be adjusted by changing the elastic deformation amount of the second elastic member 85; as a result, the second elastic member 85 may fix workpieces with different sizes in the second direction Y. In a word, the fixing member 8 according to an embodiment of the application can be used for fixing workpieces of various specifications, and has good universality.

The workpiece fixed by the fixing member 8 according to an embodiment of the application includes at least one of the bus component 7, the high-voltage connecting member and the cable. Optionally, the workpiece fixed by the fixing member 8 according to an embodiment of the application is the bus component 7.

For convenience of description, an embodiment of the application will be described below with the bus component 7 as a workpiece to be fixed by the fixing member 8.

In some embodiments, the fixing member 8 further includes a mounting part 86 which is arranged on one side, facing away from the top cover 82, of the base 81, and connected to the base 81. The mounting part 86 is installed in the external pedestal and includes a clamping shaft 861 and a plurality of elastic cards 862 protruding from the outer peripheral surface thereof The external pedestal is provided with a mounting hole fitting into the mounting part 86, through which the clamping shaft 861 of the mounting part 86 passes. When the clamping shaft 861 passes through the mounting hole, the elastic card 862 deforms under the action of the clamping shaft 861 and the wall of the mounting hole. When the clamping shaft 861 reaches the set position, the elastic card 862 presses against the wall of the mounting hole under the action of elasticity, thereby fixing the mounting part 86 on the external pedestal. The elastic card 862 may also pass through the mounting hole and be clamped on one side, away from the base 81, of the external pedestal.

In some embodiments, the top cover 82 includes a body portion 821, an inner wall, facing the base 81, of the body portion 821 is configured to constitute at least part of the top wall 831, and the first elastic member 84 is arranged on the body portion 821 of the top cover 82.

The inner wall, facing the base 81, of the body portion 821 may constitute part or all of the top wall 831. The first elastic member 84 is connected to the body portion 821 and protrudes from an inner wall thereof. When the bus component 7 passes through the accommodating groove 83, the first elastic member 84 abuts the bus component 7 against the bottom wall 832 of the accommodating groove 83.

In some embodiments, the body portion 821 is generally flat.

In some embodiments, the top cover 82 includes a body portion 821, and at least two bent portions 822 connected to both ends of the body portion 821 respectively in the second direction Y, and each of the bent portions 822 is bent towards one side close to the base 81 with respect to the body portion 821.

The two bent portions 822 are provided with the second through holes 823 aligned in the second direction Y. In other words, the projections of the two second through holes 823 in the second direction Y at least partially overlap.

The second through holes 823 of the two bent portions 822 allow an external strap to pass through. For example, when a bus component is arranged on one side, facing away from the base 81, of the body portion 821 (hereinafter referred to as an upper bus component), a strap may be used to pass through the second through holes 823 of the two bent portions 822 and surround the body portion 821 and the upper bus component to fix the upper bus component and the top cover 82 together.

In some embodiments, the first elastic member 84 is provided with a third through hole 841, and the projection of the second through hole 823 in the second direction Y at least partially overlaps with the projection of the third through hole 841 in the second direction Y.

When it is necessary to fix the upper bus component with a strap, the strap is made to pass through one side, facing the base 81, of the body portion 821. The third through hole 841 is arranged to provide an avoidance space for the strap to avoid the first elastic member 84 interfering with the strap.

In some embodiments, the first elastic member 84 includes a first elastic portion 842 connected to the body portion 821 of the top cover 82, and a first abutting portion 843 connected to one end, facing away from the body portion 821, of the first elastic portion 842. In the first direction X, the first abutting portion 843 and the bottom wall 832 are arranged at intervals, and the first abutting portion 843 is configured to abut against the bus component 7 to fix the bus component 7 between the first abutting portion 843 and the bottom wall 832.

The first elastic portion 842 is an elastically deformable part of the first elastic member 84. When the bus component 7 passes through the accommodating groove 83, the first elastic portion 842 is elastically deformed to produce an elastic force, which acts on the bus component 7 through the first abutting portion 843.

In some embodiments, the first abutting portion 843 and the top wall 831 are arranged at intervals, and the first elastic portion 842 is arranged between the first abutting portion 843 and the top wall 831. The distance between the first abutting portion 843 and the top wall 831 and the distance between the first abutting portion 843 and the bottom wall 832 may be changed by changing the deformation amount of the first elastic portion 842.

In some embodiments, a surface, facing the bottom wall 832, of the first abutting portion 843 is parallel to the bottom wall 832. Optionally, the first abutting portion 843 is flat, and the thickness direction of the first abutting portion 843 is generally parallel to the first direction X.

The area of the cross section, perpendicular to the first direction X, of the first abutting portion 843 is larger than that of the cross section, perpendicular to the first direction X, of the first elastic portion 842.

In some embodiments, at least part of the first elastic portion 842 is arc-shaped. The arc-shaped structure has good elasticity, which is helpful to improving the elastic deformation ability of the first elastic portion 842.

In some embodiments, the first elastic member 84 includes at least two first elastic portions 842 arranged at intervals in the second direction Y. In the first direction X, the two first elastic portions 842 are located between the first abutting portion 843 and the body portion 821, and may improve the stress uniformity of the first abutting portion 843 and enhance the stability of the bus component 7.

In some embodiments, the first elastic portion 842 includes a first base portion 842a connected to a surface, facing the body portion 821, of the first abutting portion 843, and having two first surfaces 8421 arranged opposite to each other in the thickness direction thereof; a first supporting portion 842b connecting the body portion 821 and one end, facing away from the first abutting portion 843 of the first base portion 842a; a first protrusion portion 842c protruding from the first surface 8421 of the first base portion 842a; and a second supporting portion 842d connecting the first protrusion portion 842c and the body portion 821, wherein the first supporting portion 842b and the second supporting portion 842d are arranged at intervals in a third direction Z which intersects with both the first direction X and the second direction Y.

The first supporting portion 842b and the second supporting portion 842d are arranged at intervals in the third direction Z, arranged therebetween a third through hole 841 which may reduce the strength of the first supporting portion 842b and the second supporting portion 842d, and improve the elasticity of the first supporting portion 842b and the second supporting portion 842d. The third through hole 841 may also provide an avoidance space for the strap to avoid the first elastic member 84 interfering with the strap.

The first supporting portion 842b is connected to an end face, facing away from the first abutting portion 843, of the first base portion 842a, and the end face of the first base portion 842a is connected to the two first surfaces 8421.

According to an embodiment of the application, the first protrusion portion 842c is provided to allow the second supporting portion 842d to avoid the end face of the first base portion 842a, and the first supporting portion 842b and the second supporting portion 842d are arranged in a staggered manner.

The first supporting portion 842b and the second supporting portion 842d may be punched. Since the first supporting portion 842b and the second supporting portion 842d are arranged in a staggered manner and do not overlap in the third direction Z, the first supporting portion 842b and the second supporting portion 842d may be formed after punched twice in the third direction Z.

In some embodiments, the first protrusion portion 842c protrudes from a first surface 8421 inside the first base portion 842a.

In some embodiments, the third direction Z is perpendicular to the first direction X and the second direction Y.

In some embodiments, the second elastic member 85 is disposed obliquely. The first inner side wall 833 is connected to an end, close to the top cover 82, of the second elastic member 85 in the first direction X. An end, away from the first inner side wall 833, of the second elastic member 85 is a free end. The second elastic member 85 is a flat plate or an arc plate, and forms an included angle with the first inner side wall 833, which is an acute angle.

In some embodiments, a groove 811 is formed on the base 81 and constitutes at least part of the accommodating groove 83. The groove 811 of the base 81 may constitute part or all of the accommodating groove 83. The groove 811 is provided with an opening in one end in the first direction X, which is covered by the top cover 82.

According to an embodiment of the application, a groove 811 is formed in the base 81 to increase the space between the base 81 and the top cover 82.

In some embodiments, the base 81 includes a bottom plate 812, and a first limiting part 813 and a second limiting part 814 connected thereto, the first limiting part 813 and the second limiting part 814 are arranged at intervals in the second direction Y, and the bottom plate 812, the first limiting part 813 and the second limiting part 814 form the groove 811.

In some embodiments, an inner wall, facing the second limiting part 814, of the first limiting part 813 may be used as the first inner side wall 833 of the accommodating groove 83, an inner wall, facing the first limiting part 813, of the second limiting part 814 may be used as the second inner side wall 834 of the accommodating groove 83, and an inner wall, facing the top cover 82, of the bottom plate 812 may be used as the bottom wall 832 of the accommodating groove 83.

In some embodiments, the distance between the top wall 831 and the bottom wall 832 in the first direction X is smaller than the distance between the first inner side wall 833 and the second inner side wall 834 in the second direction Y.

Two ends of the top cover 82 are connected to the first limiting part 813 and the second limiting part 814 respectively.

In some embodiments, one end of the top cover 82 is clamped to the first limiting part 813, and/or the other end thereof is clamped to the second limiting part 814. In other words, at least one of the first limiting part 813 and the second limiting part 814 is clamped to the top cover 82.

The clamping mode of connection is convenient to disassemble and assemble, and is helpful to simplify the assembly process of the bus component 7 and the fixing member 8. For replacing the bus component 7, the fixing member 8, which may be reused, may not be structurally damaged.

In some embodiments, one end of the top cover 82 is clamped to the first limiting part 813, and the other end thereof is rotatably connected to the second limiting part 814 through a connecting member 87.

The bus component 7 and the fixing member 8 may be assembled according to the following steps: opening the top cover 82 to detach the top cover 82 from the first limiting part 813, and rotating the top cover 82 around the connecting member 87; placing the bus component 7 in the groove 811 of the base 81; and rotating the top cover 82 to clamp the top cover 82 to the first limiting part 813.

The top cover 82 may be rotated to detach from the first limiting part 813, which is convenient for the assembly of the fixing member 8 and the bus component 7; at the same time, the connecting member 87 can maintain the connection between the top cover 82 and the base 81 when the top cover 82 is detached from the first limiting part 813, thus preventing the top cover 82 from falling.

The connecting member 87 may be integrally provided with the top cover 82, or the base 81, or the top cover 82 and the base 81. Certainly, the connecting member 87 may also be a component independent of the top cover 82 and the base 81.

The thickness of at least part of the connecting member 87 is smaller than that of the second limiting part 814.

In the process of placing the bus component 7 in the groove 811 of the base 81, the bus component 7 squeezes the second elastic member 85 to deform the second elastic member 85 which presses against the bus component 7 to position the bus component 7 in the second direction Y; after the top cover 82 is clamped to the first limiting part 813, the first elastic member 84 abuts against the bus component 7 to position the bus component 7 in the first direction X.

Figure 8:
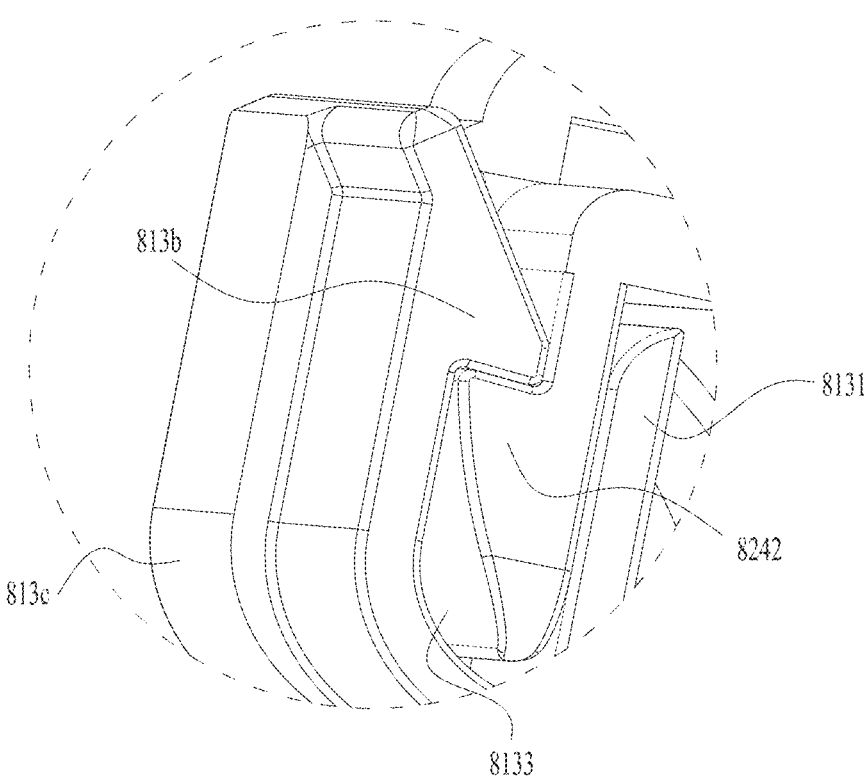
FIG. 8 is an enlarged view of the fixing member at the round frame B in FIG. 4.

FIG. 8 is an enlarged view of the fixing member at the round frame B in FIG. 4.

With reference to FIG. 7 and FIG. 8, in some embodiments, the first limiting part 813 includes a limiting plate 8131, and a clamping seat 8132 connected to the limiting plate 8131 and located at one side, away from the second limiting part 814, of the limiting plate 8131, and a clamping slot 8133 is formed between the limiting plate 8131 and the clamping seat 8132.

The top cover 82 includes a buckling portion 824 used for being inserted into the clamping slot 8133 and clamped on the clamping seat 8132.

An inner wall, facing the second limiting part 814, of the first limiting plate 8131 may be used as the first inner side wall 833 of the accommodating groove 83. The buckling portion 824 may be directly connected to the body portion 821, or indirectly connected to the body portion 821, for example, through the bent portion 822.

In some embodiments, the buckling portion 824 includes a first clamping portion 8241 and a second clamping portion 8242, which are arranged in a third direction Z intersecting with both the first direction X and the second direction Y. The clamping seat 8132 includes a third clamping portion 813a and a fourth clamping portion 813b arranged in the third direction Z.

The first clamping portion 8241 is located on one side, facing the bottom wall 832, of the third clamping portion 813a, and the second clamping portion 8242 is located on one side, facing the bottom wall 832, of the fourth clamping portion 813b when the buckling portion 824 is clamped to the clamping seat 8132. A clamping surface between the first clamping portion 8241 and the third clamping portion 813a and a clamping surface between the second clamping portion 8242 and the fourth clamping portion 813b are arranged in a staggered way in the first direction X and/or the second direction Y.

The first clamping portion 8241 and the second clamping portion 8242 may be continuously arranged in the third direction Z, or arranged at intervals in the third direction Z; while the third clamping portion 813a and the fourth clamping portion 813b may be continuously arranged in the third direction Z, or arranged at intervals in the third direction Z.

When the buckling portion 824 is inserted into the clamping slot 8133, the limiting plate 8131 and the clamping seat 8132 may be limited in the second direction Y, the third clamping portion 813a may stop the first clamping portion 8241 in the first direction X, and the fourth clamping portion 813b may stop the second clamping portion 8242 in the first direction X.

The clamping seat 8132 is configured to be elastic and deformable. When it is necessary to open the top cover 82, the clamping seat 8132 may be rotated to detach the third clamping portion 813a from the first clamping portion 8241, and to detach the fourth clamping portion 813b from the second clamping portion 8242. Exemplarily, the clamping seat 8132 includes a bent portion 813c connected to the limiting plate 8131, and the first and second clamping portions 8241 and 8242 are connected to one end, away from the limiting plate 8131, of the bent portion 813c. The bent portion 813c is configured to be elastically deformable under stress.

In an embodiment of the application, a clamping surface between the first clamping portion 8241 and the third clamping portion 813a and a clamping surface between the second clamping portion 8242 and the fourth clamping portion 813b are arranged in a staggered way in the first direction X and/or the second direction Y, so as to form a two-stage buckle structure which can improve the structural stability and reduce the risk of the buckling portion 824 falling out of the clamping slot 8133.

Figure 9:
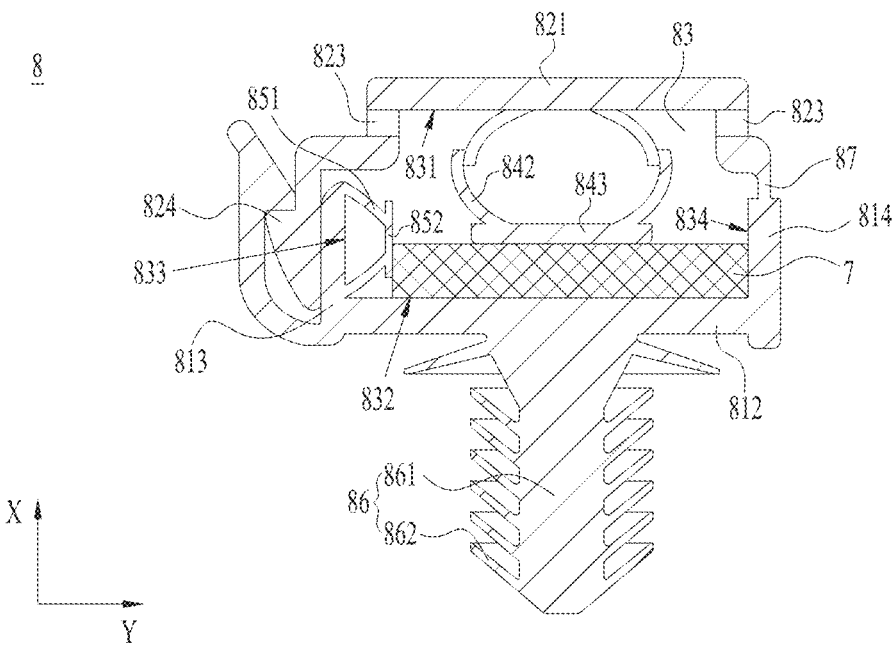
FIG. 9 is a structural schematic diagram of a fixing member provided in some other embodiments of the application when fixing a workpiece.

FIG. 9 is a structural schematic diagram of a fixing member provided in some other embodiments of the application when fixing a workpiece.

In some embodiments, the two inner side walls of the accommodating groove 83 are a first inner side wall 833 and a second inner side wall 834 respectively which are arranged opposite to each other in the second direction Y. The second elastic member includes a second elastic portion 851 and a second abutting portion 852, one end of the second elastic portion 851 is connected to the first inner side wall 833, and the second abutting portion 852 is connected to the other end, away from the first inner side wall 833, of the second elastic portion 851. In the second direction Y, the second abutting portion 852 and the second inner side wall 834 are arranged at intervals, and the second abutting portion 852 is configured to abut against the bus component 7 to fix the bus component 7 between the second abutting portion 852 and the second inner side wall 834.

The second elastic portion 851 is an elastically deformable part of the second elastic member. When the bus component 7 passes through the accommodating groove 83, the second elastic portion 851 is elastically deformed to produce an elastic force, which acts on the bus component 7 through the second abutting portion 852.

In some embodiments, the second abutting portion 852 and the first inner side wall 833 are arranged at intervals, and the second elastic portion 851 is arranged between the second abutting portion 852 and the first inner side wall 833.

The distance between the second abutting portion 852 and the first inner side wall 833 and the distance between the second abutting portion 852 and the second inner side wall 834 may be changed by changing the deformation amount of the second elastic portion 851.

A surface, facing the second inner side wall 834, of the second abutting portion 852 is parallel to the second inner side wall 834. Optionally, the second abutting portion 852 is flat, and the thickness direction of the second abutting portion 852 is generally parallel to the second direction Y.

In some embodiments, at least part of the second elastic portion 851 is arc-shaped. The arc-shaped structure has good elasticity, which is helpful to improving the elastic deformation ability of the second elastic portion 851.

Figure 10:
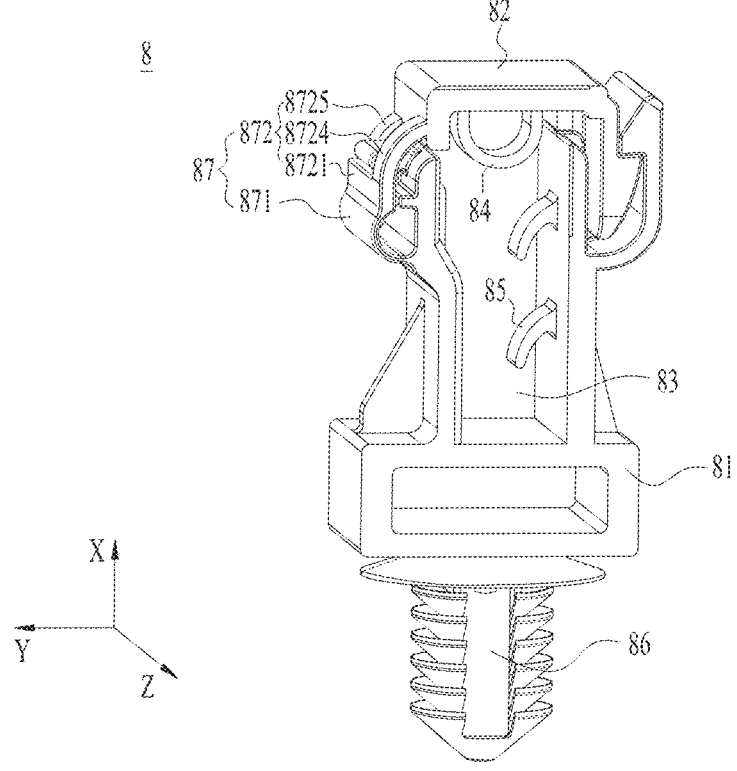
FIG. 10 is a structural schematic diagram of a fixing member provided in some other embodiments of the application.
Figure 11:
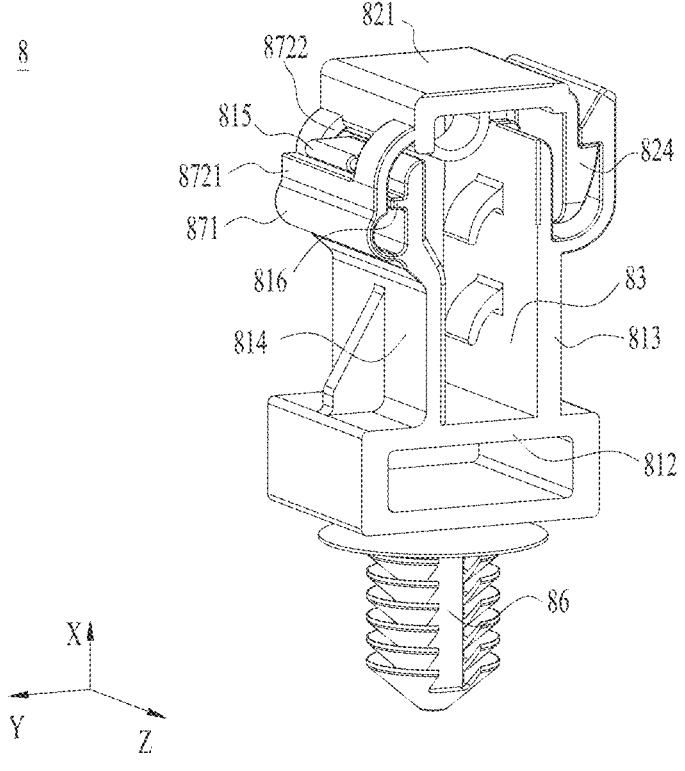
FIG. 11 is a structural schematic diagram of the fixing member at another angle in FIG. 10.
Figure 12:
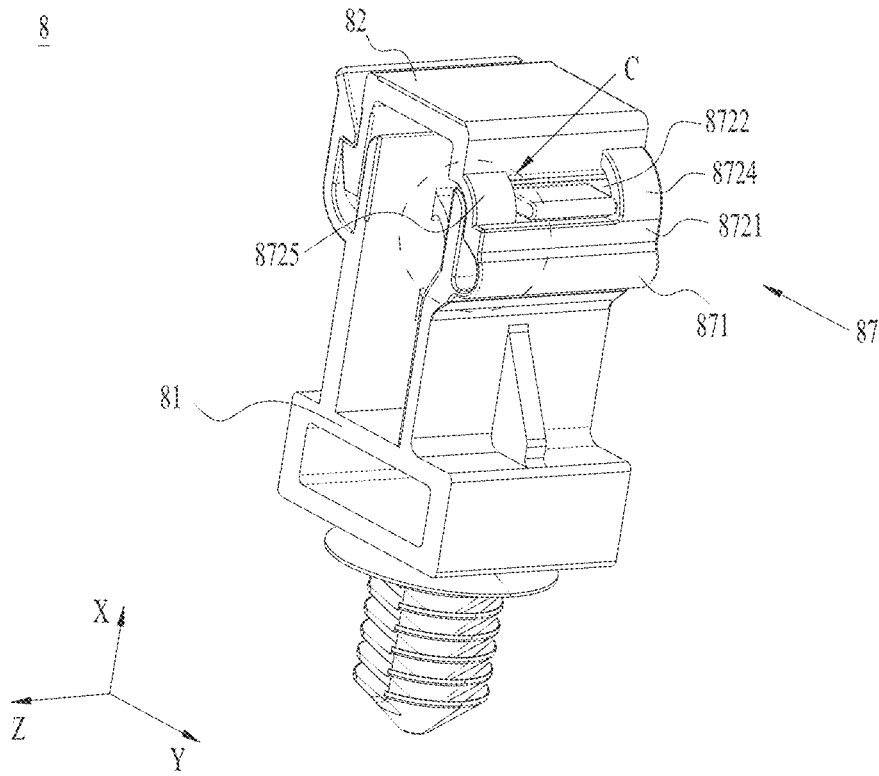
FIG. 12 is a structural schematic diagram of the fixing member at still another angle in FIG. 10.

FIG. 10 is a structural schematic diagram of a fixing member provided in some other embodiments of the application; FIG. 11 is a structural schematic diagram of the fixing member at another angle in FIG. 10; FIG. 12 is a structural schematic diagram of the fixing member at still another angle in FIG. 10; and FIG. 13 is an enlarged view of the fixing member at the round frame C in FIG. 12.

As shown in FIGS. 10-13, in some embodiments, the connecting member 87 includes a deformation portion 871 rotatably connected to the second limiting part 814, and a connecting portion 872 connected to the deformation portion 871 and the top cover 82 and provided with a backstop portion 8721. The base 81 is provided with a first convex rib 815 protruding from the second limiting part 814; when the top cover 82 is clamped to the first limiting part 813, the first convex rib 815 fits with the backstop portion 8721 to limit the movement of the connecting portion 872 in the first direction X away from the base 81.

The deformation portion 871 is located on one side, away from the first limiting part 813, of the second limiting part 814, and is configured to be deformable in the process of opening or closing the top cover 82. The strength of the deformation portion 871 is smaller than that of the connecting portion 872, and optionally, the thickness of the deformation portion 871 is smaller than that of the connecting portion 872.

The first convex rib 815 can strengthen the local strength of the second limiting part 814. In the closing process, the top cover 82 pulls the deformation portion 871 and the connecting portion 872; and the first convex rib 815 may fit with the backstop portion 8721 to limit the movement of the connecting portion 872 in the first direction X away from the base 81, avoiding excessive deformation of the deformation portion 871.

In some embodiments, the base 81 is further provided with a second convex rib 816 protruding from the second limiting part 814, and the second convex rib 816 fits with the connecting portion 872 to limit the movement of the connecting portion 872 in a direction towards the second limiting part 814.

The second convex rib 816 can strengthen the local strength of the second limiting part 814. In the closing process, the top cover 82 pulls the deformation portion 871 and the connection part 872; and the second convex rib 816 may abut against the connecting portion 872 to limit the movement of the connecting portion 872 in a direction towards the second limiting part 814, avoiding excessive deformation of the deformation portion 871 under the action of the connecting portion 872.

In some embodiments, the first convex rib 815 and the second convex rib 816 are integrally formed, and may be continuously arranged in the third direction Z.

In other embodiments, the first convex rib 815 and the second convex rib 816 are arranged in a staggered manner in the first direction X. When the top cover 82 is clamped to the base 81, the first convex rib 815 is located on one side, away from the deformation portion 871, of the stopper 8721 to limit the movement of the backstop portion 8721 in the first direction X, and the second convex rib 816 is located between the backstop portion 8721 and the second limiting part 814 to limit the movement of the backstop portion 8721 in the second direction Y.

In some embodiments, the connecting portion 872 is provided with a first through hole 8722, the backstop portion 8721 is formed on one side, close to the deformation portion 871, of the first through hole 8722, and the first convex rib 815 is inserted into the first through hole 8722 to fix with the backstop portion 8721 when the top cover 82 is clamped to the first limiting part 813.

According to an embodiment of the application, the strength of the connecting portion 872 can be reduced by providing the first through hole 8722; in this way, the connecting portion 872 can be adaptively deformed in the opening or closing process of the top cover 82. The first through hole 8722 provides a space for the first convex rib 815, which is convenient to realize the fitting of the first convex rib 815 with the backstop portion 8721.

In some embodiments, the backstop portion 8721 is connected to an end, facing away from the second limiting part 814, of the deformation portion 871. The connecting portion 872 further includes a second protrusion portion 8723, a first extension portion 8724 and a second extension portion 8725. The second protrusion portion 8723 protrudes from a surface, facing the second limiting part 814, of the backstop portion 8721. The first extension portion 8724 is connected to the top cover 82 and one end, facing away from the deformation portion 871, of the backstop portion 8721. The second extension portion 8725 is connected to the second protrusion portion 8723 and the top cover 82. The first extension portion 8724 and the second extension portion 8725 are arranged at intervals in the third direction Z intersecting with both the first direction X and the second direction Y, and the first through hole 8722 is formed between the first extension portion 8724 and the second extension portion 8725.

The first through hole 8722 may reduce the strength of the first extension portion 8724 and the second extension portion 8725, and improve the elasticity of the first extension portion 8724 and the second extension portion 8725.

The first extension portion 8724 is connected to an end face, away from the deformation portion 871, of the backstop portion 8721. According to an embodiment of the application, the second protrusion portion 8723 is provided so that the second extension portion 8725 may avoid the end face of the backstop portion 8721. In this way, the first extension portion 8724 and the second extension portion 8725 are arranged in a staggered way.

The first extension portion 8724 and the second extension portion 8725 may be punched. Since the first extension portion 8724 and the second extension portion 8725 are arranged in a staggered manner and do not overlap in the third direction Z, the first extension portion 8724 and the second extension portion 8725 may be formed after punched twice in the third direction Z.

FIG. 14 is a schematic flow chart of a method for manufacturing a battery provided in some embodiments of the application.

As shown in FIG. 14, a method for manufacturing a battery according to an embodiment of the application includes:

S100, providing an external pedestal;

S200, providing a battery cell and installing the battery cell in the external pedestal;

S300, providing a bus component and electrically connecting the bus component to the battery cell;

S400, providing a fixing member which includes a base, a top cover, a first elastic member and a second elastic member, wherein the base is connected to the top cover, an accommodating groove is formed between the base and the top cover, the first elastic member is provided between the top wall and the bottom wall of the accommodating groove, and the second elastic member is provided between the two inner walls of the accommodating groove; and S500, connecting the base to the external pedestal, and accommodating part of the bus component in the accommodating groove.

The first elastic member is configured to abut against the bus component in a first direction to fix the bus component between the top wall and the bottom wall, and the second elastic member is configured to abut against the bus component in a second direction to fix the bus component between two inner side walls of the accommodating groove, the first direction intersects with the second direction.

It should be noted that the batteries provided in the above embodiments can be made as a reference to the related structure of the battery manufactured by the above manufacturing method.

In assembling a battery based on the above battery manufacturing method, it is not necessary to follow the above steps sequentially, that is, the steps can be performed in the order mentioned in the embodiment, or in a different order from that mentioned in the embodiment, or several steps can be performed simultaneously. For example, step 5100 and step 5400 may be performed in no particular order, or at the same time.

Figure 15:
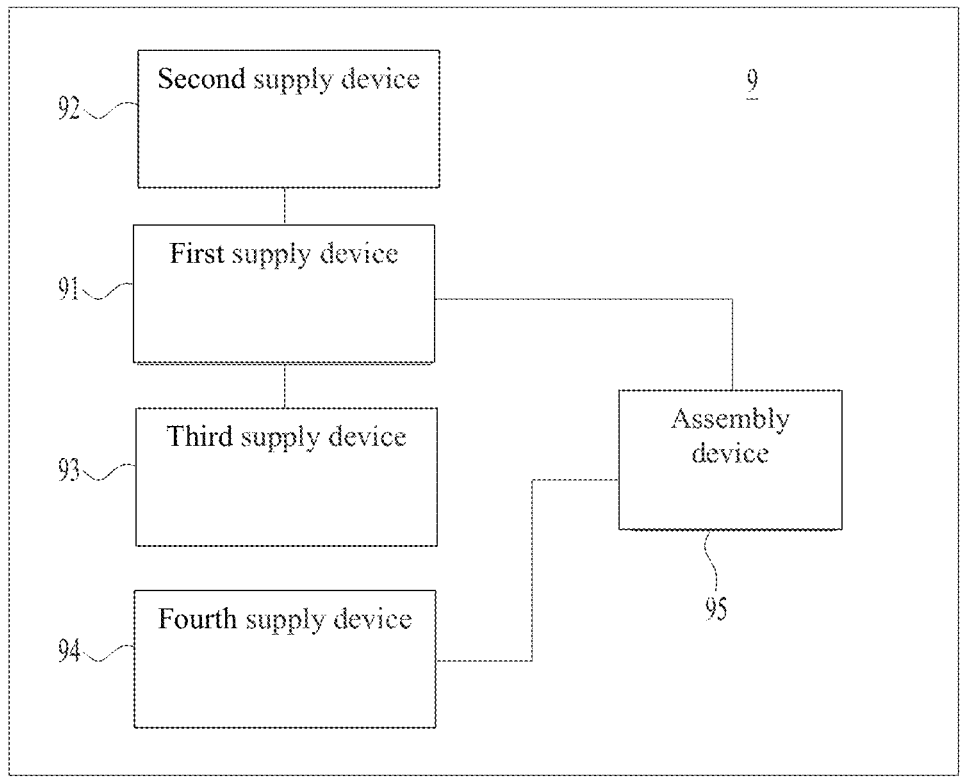
FIG. 15 is a schematic block diagram of a system for manufacturing a battery provided in some embodiments of the application.

FIG. 15 is a schematic block diagram of a system for manufacturing a battery provided in some embodiments of the application.

As shown in FIG. 15, a system 9 for manufacturing a battery according to an embodiment of the application includes a first supply device 91, configured to provide an external pedestal; a second supply device 92, configured to provide a battery cell and install the battery cell in the external pedestal; a third supply device 93, configured to provide a bus component and electrically connecting the bus component to the battery cell; a fourth supply device 94, configured to provide a fixing member which includes a base, a top cover, a first elastic member and a second elastic member, wherein the base is connected to the top cover, an accommodating groove is formed between the base and the top cover, the first elastic member is provided between the top wall and the bottom wall of the accommodating groove, and the second elastic member is provided between the two inner walls of the accommodating groove; and an assembly device 95, connecting the base to the external pedestal, and accommodating part of the bus component in the accommodating groove, wherein the first elastic member is configured to abut against the bus component in a first direction to fix the bus component between the top wall and the bottom wall, and the second elastic member is configured to abut against the bus component in a second direction to fix the bus component between two inner side walls of the accommodating groove, the first direction intersects with the second direction.

The batteries provided in the above embodiments can be made as a reference to the related structure of the battery manufactured by the above manufacturing method.

It should be noted that the embodiments in the application and features in the embodiments may be combined with one another if there is no conflict.

Finally, it should be noted that the above embodiments are merely used to describe the technical solution of the application, rather than limiting the same. Although the application has been described in detail with reference to the foregoing embodiments, those skilled in the art should understand that the technical solution described in the foregoing embodiments may still be modified, or some of the technical features therein may be equivalently replaced. However, these modifications or substitutions do not make the essence of the corresponding technical solutions deviate from the spirit and scope of the technical solutions of each embodiment of the application.

What is claimed is:

1. A fixing member for fixing a workpiece, comprising:
a base for connecting an external pedestal;
a top cover connected to the base, an accommodating groove for accommodating the workpiece being formed between the base and the top cover;
a first elastic structure arranged between a top wall and a bottom wall of the accommodating groove, and configured to abut against the workpiece in a first direction to fix the workpiece between the top wall and the bottom wall; and
a second elastic structure arranged between two inner side walls of the accommodating groove, and configured to abut against the workpiece in a second direction to fix the workpiece between the two inner side walls of the accommodating groove, with the first direction intersecting with the second direction,
wherein the top cover comprises a body portion, an inner wall, facing the base, of the body portion is configured to constitute at least part of the top wall, and the first elastic structure is arranged on the body portion of the top cover,
the first elastic structure comprises:
a first elastic portion connected to the body portion of the top cover; and
a first abutting portion connected to one end, facing away from the body portion, of the first elastic portion;
in the first direction, the first abutting portion and the bottom wall are arranged at intervals, and the first abutting portion is configured to abut against the workpiece to fix the workpiece between the first abutting portion and the bottom wall, and
at least part of the first elastic portion is arc-shaped.

2. The fixing member according to claim 1, wherein the first elastic structure comprises at least two first elastic portions arranged at intervals in the second direction; and
in the first direction, the two first elastic portions are located between the first abutting portion and the body portion.

3. The fixing member according to claim 2, wherein the first elastic portion comprises:
a first base portion connected to a surface, facing the body portion, of the first abutting portion, and having two first surfaces arranged opposite to each other in the thickness direction thereof;
a first supporting portion connecting the body portion and one end, facing away from the first abutting portion, of the first base portion;

a first protrusion portion protruding from the first surface of the first base portion; and a second supporting portion connecting the first protrusion portion and the body portion, the first supporting portion and the second supporting portion being arranged at intervals in a third direction which intersects with both the first direction and the second direction.

4. The fixing member according to claim 3, wherein, the two inner side walls of the accommodating groove are a first inner side wall and a second inner side wall respectively which are arranged opposite to each other in the second direction;

the second elastic structure comprises:

a second elastic portion, with one end connected to the first inner side wall;

a second abutting portion connected to the other end, facing away from the first inner side wall, of the second elastic portion;

in the second direction, the second abutting portion and the second inner side wall are arranged at intervals, and the second abutting portion is configured to abut against the workpiece to fix the workpiece between the second abutting portion and the second inner side wall.

5. The fixing member according to claim 4, wherein a groove is formed on the base and constitutes at least part of the accommodating groove.

6. The fixing member according to claim 5, wherein, the base comprises a bottom plate, and a first limiting part and a second limiting part connected thereto, the first limiting part and the second limiting part are arranged at intervals in the second direction, the bottom plate, the first limiting part and the second limiting part form the groove; and one end of the top cover is clamped to the first limiting part, and/or the other end thereof is clamped to the second limiting part.

7. The fixing member according to claim 6, wherein, one end of the top cover is clamped to the first limiting part, and the other end thereof is rotatably connected to the second limiting part through a connecting structure.

8. The fixing member according to claim 7, wherein, the connecting structure comprises a deformation portion rotatably connected to the second limiting part, and a connecting portion connected to the deformation portion and the top cover and provided with a backstop portion;

the base is provided with a first convex rib protruding from the second limiting part; when the top cover is clamped to the first limiting part, the first convex rib fits with the backstop portion to limit the movement of the connecting portion in the first direction away from the base.

9. The fixing member according to claim 8, wherein the base is further provided with a second convex rib protruding from the second limiting part, and the second convex rib fits with the connecting portion to limit the movement of the connecting portion in a direction towards the second limiting part.

10. The fixing member according to claim 9, wherein the first convex rib and the second convex rib are integrally formed.

11. The fixing member according to claim 10, wherein the connecting portion is provided with a first through hole, the backstop portion is formed on one side, close to the deformation portion, of the first through hole, and the first convex rib is inserted into the first through hole to fix with the backstop portion when the top cover is clamped to the first limiting part.

12. The fixing member according to claim 11, wherein the backstop portion is connected to an end, facing away from the second limiting part, of the deformation portion;

the connecting portion further comprises:

a second protrusion portion protruding from the surface, facing the second limiting part, of the backstop portion;

a first extension portion connecting the top cover and one end, facing away from the deformation portion, of the backstop portion; and a second extension portion connecting the second protrusion portion and the top cover, the first extension portion and the second extension portion are arranged at intervals in a third direction which intersects with both the first direction and the second direction, and the first through hole is formed between the first extension portion and the second extension portion.

13. The fixing member according to claim 12, wherein the first limiting part comprises a limiting plate, and a clamping seat connected to the limiting plate and located at one side, away from the second limiting part, of the limiting plate, and a clamping slot is formed between the limiting plate and the clamping seat;

the top cover comprises a buckling portion used for being inserted into the clamping slot and clamped to the clamping seat.

14. The fixing member according to claim 13, wherein, the buckling portion comprises a first clamping portion and a second clamping portion, both arranged in a third direction which intersects with both the first direction and the second direction;

the clamping seat comprises a third clamping portion and a fourth clamping portion which are arranged in the third direction;

when the buckle is clamped to the clamping seat, the first clamping portion is located at one side, facing the bottom wall, of the third clamping portion, and the second clamping portion is located at one side, facing the bottom wall, of the fourth clamping portion;

a clamping surface between the first clamping portion and the third clamping portion and a clamping surface between the second clamping portion and the fourth clamping portion are arranged in a staggered way in the first direction and/or the second direction.

15. The fixing member according to claim 14, wherein the top cover comprises a body portion, and at least two bent portions connected to both ends of the body portion respectively in the second direction, and each of the bent portions is bent towards one side close to the base with respect to the body portion;

the two bent portions are provided with second through holes aligned in the second direction.

16. The fixing member according to claim 15, wherein the first elastic structure is provided with a third through hole, and the projection of the second through hole in the second direction at least partially overlaps with the projection of the third through hole in the second direction.

17. The fixing member according to claim 16, further comprising a mounting part arranged on one side, facing away from the top cover, of the base, and connected to the base;

the mounting part is installed in the external pedestal and comprises a clamping shaft and a plurality of elastic cards protruding from an outer peripheral surface thereof.

18. The fixing member according to claim 17, wherein the workpiece comprises a bus component of a battery.

19. A battery, comprising:

a battery cell;

a bus component electrically connected to the battery cell; and the fixing member according to claim 18, the bus component being configured to pass through the accommodating groove.

20. An electric device, comprising the battery according to claim 19, the battery being used for providing electrical energy.

21. A method for manufacturing a battery, comprising:

providing an external pedestal;

providing a battery cell and installing the battery cell in the external pedestal;

providing a bus component and electrically connecting the bus component to the battery cell;

providing a fixing member which comprises a base, a top cover, a first elastic structure and a second elastic structure, the base being connected to the top cover, an accommodating groove being formed between the base and the top cover, the first elastic structure being provided between a top wall and a bottom wall of the accommodating groove, and the second elastic structure being provided between the two inner walls of the accommodating groove; and connecting the base to the external pedestal, and accommodating part of the bus component in the accommodating groove, wherein, the first elastic structure is configured to abut against the bus component in a first direction to fix the bus component between the top wall and the bottom wall, and the second elastic structure is configured to abut against the bus component in a second direction to fix the bus component between two inner side walls of the accommodating groove, the first direction intersects with the second direction, the top cover comprises a body portion, an inner wall, facing the base, of the body portion is configured to constitute at least part of the top wall, and the first elastic structure is arranged on the body portion of the top cover, the first elastic structure comprises:

a first elastic portion connected to the body portion of the top cover; and a first abutting portion connected to one end, facing away from the body portion, of the first elastic portion;

in the first direction, the first abutting portion and the bottom wall are arranged at intervals, and the first abutting portion is configured to abut against the workpiece to fix the workpiece between the first abutting portion and the bottom wall, and at least part of the first elastic portion is arc-shaped.

* * * * *